United States Patent
Chow et al.

(10) Patent No.: US 8,458,792 B2
(45) Date of Patent: *Jun. 4, 2013

(54) SECURE METHOD AND SYSTEM FOR COMPUTER PROTECTION

(75) Inventors: Stanley T. Chow, Ottawa (CA); Harold T. Johnson, Ottawa (CA); Alexander Main, Ottawa (CA); Yuan Xiang Gu, Ottawa (CA)

(73) Assignee: Irdeto Canada Corporation, Kanata, ON (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/106,519

(22) Filed: May 12, 2011

(65) Prior Publication Data

US 2011/0214179 A1 Sep. 1, 2011

Related U.S. Application Data

(63) Continuation of application No. 10/851,131, filed on May 24, 2004, now Pat. No. 7,958,554, which is a continuation of application No. PCT/CA02/01806, filed on Nov. 26, 2002.

(30) Foreign Application Priority Data

Nov. 26, 2001 (CA) ....................................... 2363795

(51) Int. Cl.
*G06F 12/14* (2006.01)
*G06F 17/30* (2006.01)

(52) U.S. Cl.
USPC ............. 726/22; 713/187; 713/188; 713/189; 726/26

(58) Field of Classification Search
None
See application file for complete search history.

(56) References Cited

U.S. PATENT DOCUMENTS

| 5,475,625 A | 12/1995 | Glaschick |
| 5,517,568 A | 5/1996 | Grube |

(Continued)

FOREIGN PATENT DOCUMENTS

| WO | 99/01815 | 1/1999 |
| WO | 00/65444 | 11/2000 |
| WO | 01/79969 | 10/2001 |

OTHER PUBLICATIONS

Christophe Bidan, Valerie Issarny, Security Benefits from Software Architecture,1997, Proceeding of the Second International Conference on Coordination Languages and Models, ISBN 3-540-63383-9, vol. 1282, pp. 64-80.*

(Continued)

*Primary Examiner* — Philip Chea
*Assistant Examiner* — Fatoumata Traore

(57) ABSTRACT

Attacks by computer viruses, worm programs, and other hostile software ('malware'), have become very serious problems for computer systems connected to large communication networks such as the Internet. One potential defense against such attacks is to employ diversity—that is, making each copy of the attacked software different. However, existing diversity techniques do not offer sufficient levels of protection. The invention provides an effective diversity solution by applying tamper resistant software (TRS) encoding techniques, to the communications that take place between software components, with corresponding changes to the code handling those communications. These communications may include, for example, data passed between software routines via parameters or mutually accessible variables, light-weight messages, signals and semaphores passed between threads, and messages passed between software processes. Effective TRS encoding techniques include data-flow encoding and mass-data encoding techniques.

4 Claims, 4 Drawing Sheets

U.S. PATENT DOCUMENTS

| | | | |
|---|---|---|---|
| 5,530,752 | A | 6/1996 | Rubin |
| 5,892,899 | A * | 4/1999 | Aucsmith et al. ............... 726/27 |
| 6,088,452 | A | 7/2000 | Johnson |
| 6,266,416 | B1 | 7/2001 | Sigbjornsen |
| 6,668,325 | B1 | 12/2003 | Collberg |
| 6,782,478 | B1 | 8/2004 | Probert |
| 6,842,862 | B2 | 1/2005 | Chow |
| 2003/0163718 | A1 | 8/2003 | Johnson |

OTHER PUBLICATIONS

Nickerson et al., "The Encoder Solution to Implementing Tamper Resistant Software", 2002, pp. 1-4.

Bidan et al., "Security Benefits from Software Architecture", Proceeding of the Second International Conference on Coordination Languages and Models, 1997, ISBN 3-540-63383-9, vol. 1282, pp. 64-80.

* cited by examiner

SECURE METHOD AND SYSTEM FOR COMPUTER PROTECTION

RELATED APPLICATIONS

The present application is a continuation of U.S. Ser. No. 10/851,131 filed May 24, 2004, which is a continuation of PCT Application No. PCT/CA02/01806 designating the United States and filed 26 Nov. 2002, the disclosures of which are expressly incorporated herein by reference in their entirety.

FIELD OF THE INVENTION

The present invention relates generally to computer software and communications, and more specifically, to a method and system which makes computers and servers connected to large communication networks, resistant to automated attacks

BACKGROUND TO THE INVENTION

Digital devices and communication networks are now almost pervasive in industrialized nations. Personal computers (PCs) sit on almost every desktop and in almost every home, being relied upon daily to store, process and transfer all kinds of personal and business information. The explosive growth in PC use has been complemented by growth in large digital communication networks such as metronets and the Internet. This combination of computing devices and communication networks has resulted in levels of access to information, data and electronic services that was little more than a dream, a decade ago.

However, attacks by computer viruses, worm programs, and other hostile software ('malware'), have become very serious problems for computer systems connected to large communication networks such as the Internet. Malware is a general term referring to any kind of software entity-directly executable, executable by an interpreter, or non-executable—whose purpose is to harm or to obtain unauthorized access to a computer system, typically with no human intervention in its operation.

Such attacks are also referred to as "exploits". An exploit is a software entity which makes use of a system vulnerability in order to perform some action not intended by the system's designers. A list of the kinds of vulnerabilities commonly exploited can be found in "How to eliminate the ten most critical Internet security threats: The experts' consensus", available at the SANS Resources web site (June 2001). This document provides a list of the security weaknesses which are involved in the largest number of security breaches.

Such automated or "canned" attacks are arguably a threat to the productive use of computers and computer systems in the modern world. Attacks by human hackers actively attempting to penetrate systems themselves are a far smaller threat, because human hackers cannot be massively replicated and distributed, or passed on to hostile but less sophisticated attackers. On the other hand, software entities such as computer viruses, worm programs, e-mails with hostile attachments, attack scripts, and denial-of-service attacks, including massive distributed "spamming", can be generated by unskilled attackers using software developed by experts. More importantly, such automated attacks are often designed to propagate themselves through a network causing massive and widespread damage, rather than focussing on a single target. Thus, automated attacks have an entirely different threat model with quite different security parameters than non-automated attacks.

Defences against such automated attacks have been attempted in many ways including the following:
  friend/foe identification, for example, requiring users to identify themselves with a login name and secret password to gain access to a system;
  sand-box approaches in which imported software runs in a limited sub-environment. See for example, the open-source Janus sand-box protection system from the University of California at Berkeley;
  virus-detection software which may either scan software as it is being downloaded, or scan it prior to execution. See, for example Norton AntiVirus™;
  firewall software facilities which attempt to limit communication into a computer or local network in order to prevent, slow down, or render less hazardous the arrival of hostile software entities;
  behaviour profiles, which compare user's activities to statistical summaries of a user's normal activity which they have prepared over time. For example, suppose a user normally has almost no outgoing file transfers from her/his computer over the network. If a sudden flurry of outgoing file transfers occurs, it could be that an intruder has penetrated the system and is stealing information. The intrusion-detection system notes that the behaviour is atypical, and may then shut down the outgoing transfers, block access to the network, inform the user, keep a record of the occurrence, or any combination of such things.

There are several major problems with behaviour-profiles, including the following:
  any profile obtained over a reasonably short period of time is unlikely to capture all legitimate behaviours, and activities which are perfectly legitimate, but infrequent, will often be interpreted as security violations;
  rule-based access controls based on military security systems. See for example, information on SELinux (Security-Enhanced Linux), online. SELinux is a research prototype from NSA of a Linux operating system which applies access control rules to enhance system security, released for experimental purposes, primarily under the Gnu Public License; and
  more comprehensive strategies such as that of the STATNeutralizer™. STATNeutralizer is a site protection system combining rule-based access control, intrusion detection using statistical profiles, and recognition of malware ancestry by pattern-matching on their code. In other words, the STATNeutralizer attempts to identify malware and prevent its execution attempts to limit the damage by profiling expected behaviour, and then (once unexpected behaviour is detected) to limit the damage by shutting down part or all of the system.

Despite such attempts, good defences remain labour-intensive, and outside the easy reach of home computers and other low-cost system installations.

Part of the problem with these attempts is that they are unable to address new attack strategies and tools. Virus detection tools, for example, must be updated regularly to be effective against new viruses. Even with regular updates it is impossible for a virus detection strategy to offer flawless protection because no amount of updating will protect a system from unknown future viruses.

There are proposals for new diversity-based approaches which, rather than trying to keep up with changes in malware, diversify the attacked systems to make the creation of effective malware more difficult. The two main approaches are:

- varying systems over time as described by Frederick B. Cohen in "Operating system protection through program evolution", Computers and Security, 12 (6), October 1993, and
- varying instances over systems in space as described by Stephanie Forrest, Anil Somayaji, and David H. Ackley, in "Building diverse computer systems", *Proceedings of the 6th Workshop on Hot Topics in Operating Systems*, pages 67-72, Los Alamitos, Calif., 1997, IEEE Computer Society Press.

The premise is that widely deployed software is easy to attack because all of the instances of that software are exactly alike. Since exploits are, almost always, entirely "canned" (i.e., they are performed entirely by software entities created in advance by a knowledgeable attacker, rather than requiring ongoing human participation during the execution of the exploit), the exploit must depend on a priori understanding of how the attacked system works: human intelligence cannot be applied during execution of such an exploit when a surprise is encountered. If the a priori expectations of the exploit's creator can be rendered erroneous by diversifying instances of the system, the exploit fails.

To implement Cohen's proposal, the system to be protected must be augmented with software which modifies the system on an ongoing basis (i.e., diversity occurs over the passage of time: yesterday's program differs from today's). Thus, at some level, the Cohen system must rely on self-modifying code, which is widely regarded as unreliable and unpredictable.

Forrest et al. consider diversity in which changes are not successive, but start with the same root software which is then modified in a random fashion. As a result, diversity according to Forrest et al. might be termed spatial diversity: different system creation instances use differing random input, so that different installations, distributed in space, contain diverse systems.

However, whether the diversity is through time as proposed by Cohen, or through space as suggested by Forrest et al., the kinds of diversity which have been proposed are less than substantial. While superficial changes might be effective against some malware, more substantial changes would be effective against a broader spectrum of malware.

Examples of the superficial changes which these proposals effect include the following: both Cohen and Forrest et al. suggest re-orderings of instructions within basic blocks (BBs) of code. A basic block is a maximal straight-line code sequence entered only at its beginning and exited only at its end. Note that this re-ordering has no impact on the data-flow graph of the BB—the change is entirely superficial. Malware identifying attack points by pattern matching could bypass such a defence.

The execution of a software program may be described in terms of its data-flow and control-flow. Data-flow refers to the 'ordinary computation' of a program: addition, subtraction, multiplication, division, Boolean computations, masking operations, and the like: the scalar data-flow of a program. The control-flow of a program refers to the control-transfers in the program—the decision points, and branch instructions that govern which lines of code in the program are to be executed;

Forrest et al. suggest re-ordering the parameters of routines. This is a slightly deeper change. However, the impact on the object code will typically only be to change the register numbers or local offsets of particular pieces of data. Again, the new data-flow graph after such a change will be isomorphic to the original one: the change is again quite superficial. Malware using pattern-matching identification of routines can bypass this defence;

Forrest et al. also propose performing compiler optimizations for parallel processing (where the target platform is not a parallel machine, since otherwise this would not constitute a change; it would simply be normal compilation procedure). This permits re-ordering of code among BBs instead of within BBs, which is a somewhat deeper change.

However, this has little effect on the data-flow patterns (expression graphs) used to compute particular values, and only changes the sites in the code where the operations in the expression graphs occur. The change remains superficial, though the pattern matching required of malware to bypass this defence is more complex.

Since these kinds of transformations are well understood in the art of compiler optimization, correcting for such transformations is by no means an insurmountable problem for sufficiently sophisticated malware—and there is every expectation that the sophistication of malware will continue to increase, as the history of such attacks over the last few years very clearly indicates;

Forrest et al. propose renaming entry points in APIs (application procedural interfaces). This will entirely frustrate attacks based on linking to such APIs using only name information, but will have no effect whatever on any attack which identifies such entry points by their initial code patterns instead of by name. Again, the superficial nature of the change makes it ineffective against (in this case, only moderately) more sophisticated malware; and Forrest et al. propose randomly modifying the sizes of routine stack frames. Making this change may foil an exploit using a particular buffer-overflow weakness of a particular Unix™ utility, but if the exploit relies on exact knowledge of stack frame layout. As many exploits do not rely on such knowledge, this solution does not have universal application.

There is therefore a need for a method and system which provides resistance to automated attacks. This method and system should have minimal impact on the reliability and operability of existing software and computer systems, and consume as little additional resources as possible.

SUMMARY OF THE INVENTION

It is therefore an object of the invention to provide a novel method and system for providing resistance to automated software attacks which obviates or mitigates at least one of the disadvantages of the prior art.

One embodiment of the invention protects computer systems against malware attacks by substantially altering the data representations used to communicate information among its software components, with corresponding changes to the code manipulating the data in these representations.

As well, different instances of a protected system can be created such that representations differ among instances. That is, a malware writer may study and become able to attack one instance of the protected system, but the resulting malware will then not work against another instance.

Such an approach may be likened to the Biblical story of the tower of Babel (see The Bible, Genesis 11:1-9). When human beings rebel against God by attempting to construct the tower of Babel to reach heaven, God throws their efforts into confusion by scrambling their languages so that they can no longer communicate.

The difference of course, is that when the invention is applied, pairings of software components can continue to communicate with one another, but the "language" spoken between any two software components is unique and unintelligible to all other components and any outsiders.

The defence of the invention has the important virtue that it defends against tomorrow's malware. Unlike virus- and worm-detection approaches, or profile-driven approaches, it does not depend on historical information. It depends on an ability to develop unique dialects by which system components will communicate. No creator of malware can anticipate what dialects might be chosen for any given instance of a system protected by the defence of the invention.

One aspect of the invention is broadly defined as a method for converting a software program to a form in which it is resistant to automated attacks, the software program consisting of lines of code, the method comprising the steps of: identifying communications within the software program; and applying tamper-resistant encoding techniques on the lines of code which effect the identified communications; the tamper-resistant encoding techniques varying from one instance of the software program to another.

BRIEF DESCRIPTION OF THE DRAWINGS

Embodiments of the invention will be described with reference to the drawings, in which.

DETAILED DESCRIPTION

The current invention is related to the concept of protection through diversity, but greatly expands on previous proposals by organizing the method around a new central idea. Briefly, the invention uses tamper resistant software (TRS) encoding techniques to protect software against malware attacks, by applying TRS encoding techniques to focus on the communications that take place between software components.

This is quite a different application than TRS encoding techniques were originally designed for. TRS encoding techniques where originally intended to prevent an attacker who has complete access to a piece of software code from making changes to the software which the attacker would consider useful, for example, overcoming password protection code, or altering code which limits the number of executions that can be performed.

The approach of the invention is based on the observation that rendering fraudulent communications effectively meaningless prevents the effects which the fraud was intended to achieve. In the defence of the invention, the communications among components of the software system are modified, with corresponding changes to the code handling those communications.

Figure 1:
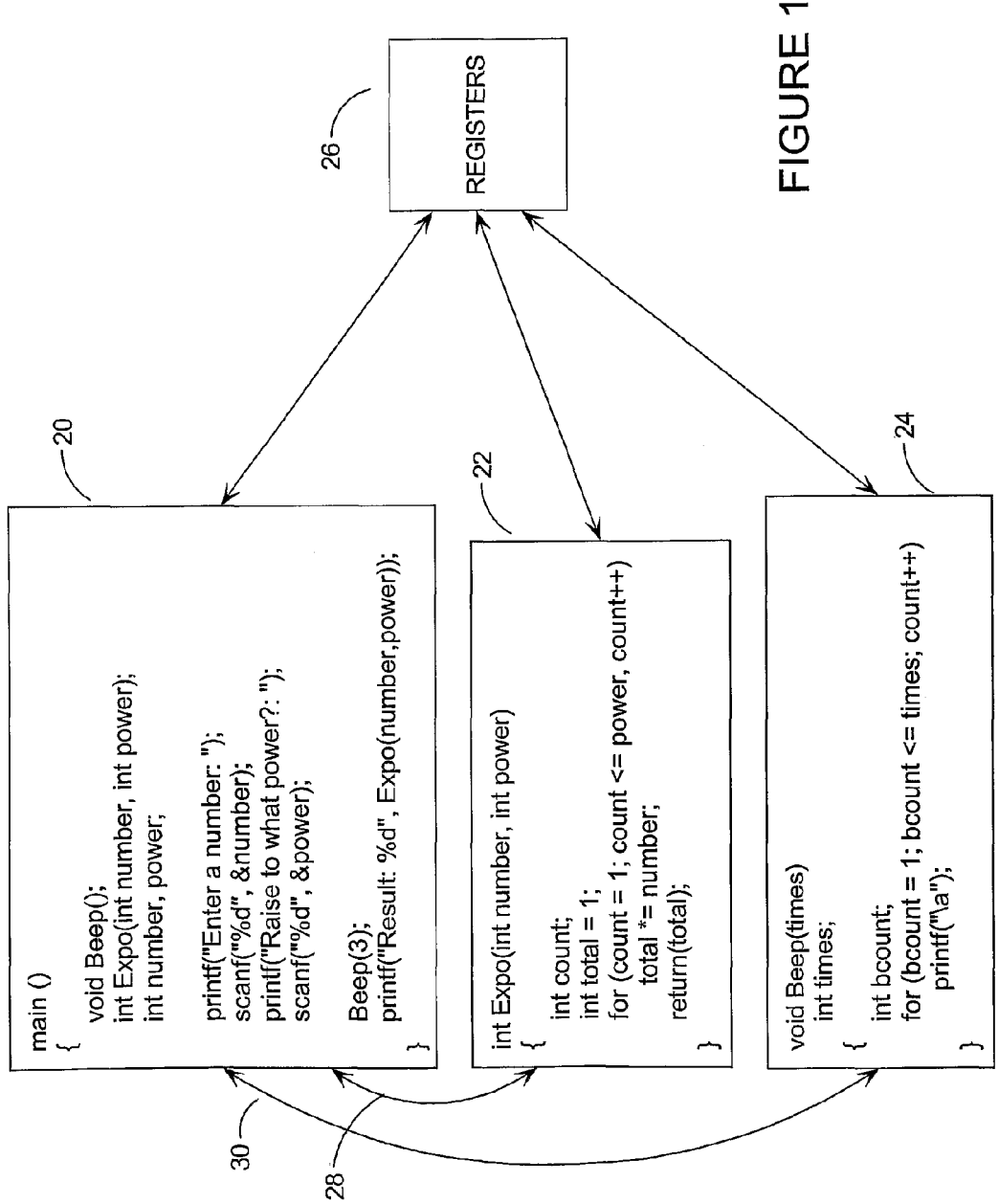
FIG. 1 presents an exemplary block diagram of communication paths between software routines and data registers.
Figure 2:
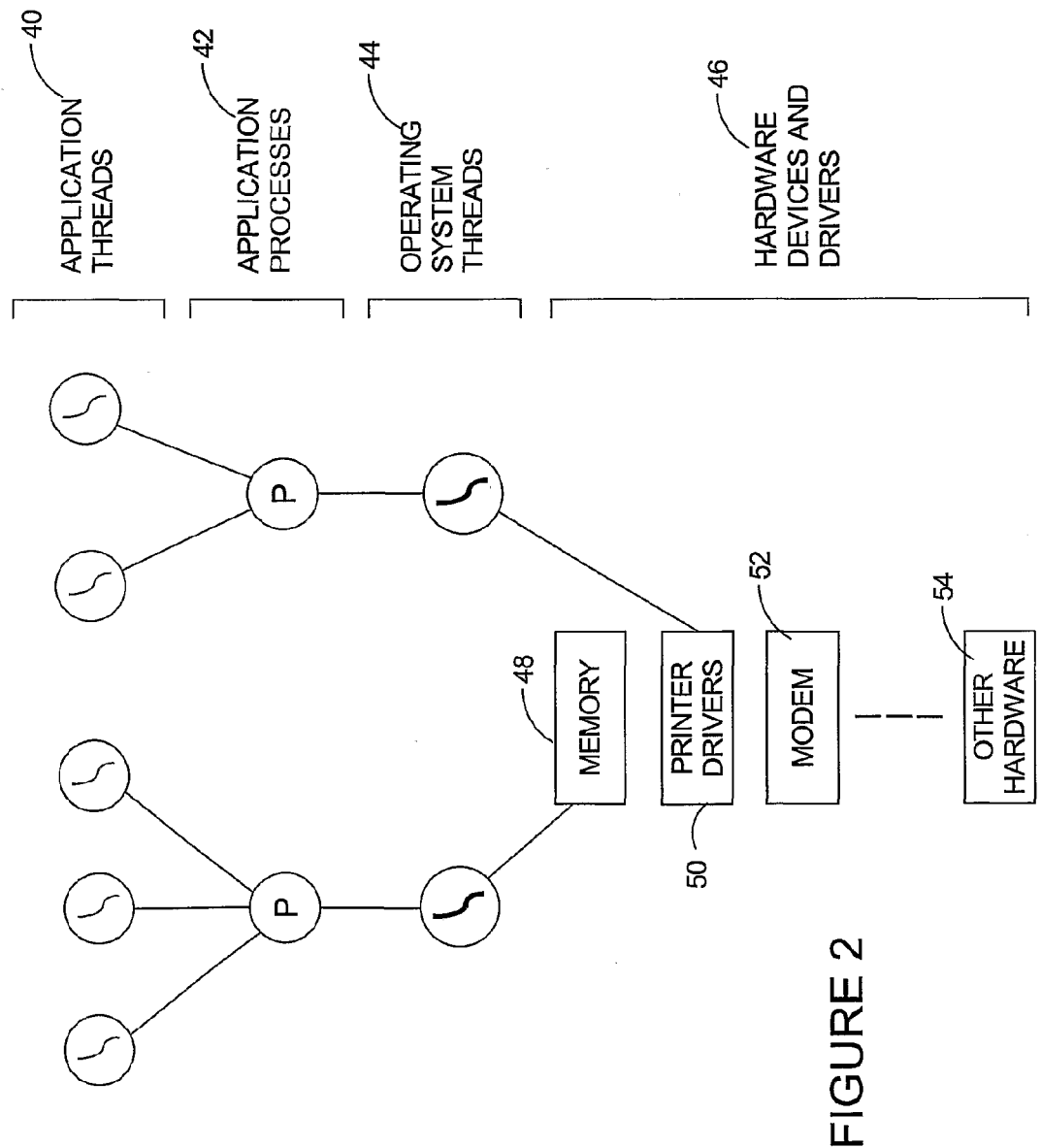
FIG. 2 presents an exemplary block diagram of communication paths between software components at the level of threads and software processes.

While software components may take many different forms and be described in many different ways, an exemplary collection of communicating components of various kinds is presented in FIGS. 1 and 2. From the bottom up, taking a dynamic (execution-time) view, one might have:

1. within the body of a software routine, a collection of instructions communicating via data passed in registers or memory. Referring to FIG. 1, for example, each of routines 20,22 and 24 may communicate with the set of registers 26;

2. among software routines, communication is generally performed via parameters passed from callers to callees and return values returned from callees to callers, supplemented by data passed in mutually accessible variables. These transfers are identified by arrows 28 and 30 in FIG. 1;

3. software routines are dynamically organized into threads of control (40 in FIG. 2) which communicate via lightweight message transmission, signals, semaphores, and the like, again supplemented by communication through mutually accessible variables;

4. threads are organized into heavier-weight processes 42 with distinct address spaces, communicating via heavier-weight messages.

Operating system threads 44 allow these application threads 40 and processes 42 to communicate with various hardware devices and drivers 46 which make up the input and output devices of a computer system. These hardware devices and drivers 46 may include, for example, memory 48, printer drivers 50, modems 52 and other hardware 54;

5. processes are organized into executing programs which communicate via program invocations, files, and the like, and partitioned among various privilege levels (e.g., some execute as part of the operating system, and some execute as applications or parts of applications running at the user level); and 6. the execution of a node in a network contains the execution of many processes. Nodes communicate via network communication protocols such as TCP/IP.

Software communications may be identified at every level, but the nature of the communication changes with the nature of the communicating entities and the level in the system at which they reside. The view listed above is somewhat arbitrary, but it should at least be clear that real systems do indeed consist of communicating components which are inevitably nested along lines quite similar to those suggested above.

Many suitable TRS encoding techniques exist which might be used to effect the invention, including those described in the following:

A. David Aucsmith and Gary Graunke. Tamper-resistant methods and apparatus. U.S. Pat. No. 5,892,899, 1999.

B. Stanley Chow, Harold Johnson, and Yuan Gu. Tamper resistant software-control flow encoding. Filed under the Patent Cooperation Treaty on Aug. 18, 2000, under Ser. No. PCT/CA00/00943, 2000.

C. Stanley Chow, Harold Johnson, and Yuan Gu. Tamper resistant software encoding. Filed under the Patent Cooperation Treaty on Jun. 8, 2000, under Ser. No. PCT/CA00/00678, 2000.

D. Stanley Chow, Harold Johnson, and Yuan Gu. Tamper resistant software-mass data encoding. Filed under the Patent Cooperation Treaty on Apr. 12, 2001, under Ser. No. PCT/CA01/00493, 2001.

E. M. Mambo, T. Murayama, and E. Okamoto. A tentative approach to constructing tamper resistant software. In Workshop on New Security Paradigms, pages 23-33, 1998; and F. C. Wang, J. Hill, J. Knight, and J. Davidson. Software tamper resistance: Obstructing static analysis of programs. Technical Report 12, Department of Computer Science, University of Virginia, 2000.

Other suitable techniques would be clear to one skilled in the at from the teachings herein. As well, the most effective approaches for applying these techniques are described in greater detail hereinafter.

As noted above, the intention of the invention is to protect against automated malware as opposed to human attackers who are capable of modifying their attack strategy as they progress, responding to new developments or information. Thus, some changes in emphasis relative to current TRS technology are preferable. In particular:

1. it is preferable that high-security, high-overhead approaches such as those in A, B, C, D, and F above be modified to reduce their overhead, since any "canned attack has low adaptability and the security level can, with profit, be correspondingly reduced. As well, low overhead will be helpful to permit broad coverage;
2. a software system has more comprehensive protection needs than an individual piece of software. As a result, existing TRS approaches deployed in a malware protection context can benefit from extensions to include protection in a number of additional areas;
3. adjustments are desirable to the TRS methodology to provide diversity in such a form that effectively testing many diverse instances of the system to be protected is facilitated; and
4. as automated malware has no "observer" against which software can be obscured, the obscuring value of TRS encoding techniques is of little value. Thus, TRS encoding techniques should not focus on obscurity at the expensive of system resources and/or performance parameters. This will be discussed in greater detail hereinafter.

To reiterate, an attempt to perpetrate a fraud generally depends on fraudulent communication. Thus, by diversifying data representations used in communication between software components, fraudulent communications can be rendered effectively meaningless, so the invention can prevent the effect which any such fraud was intended to achieve.

The broad embodiment of the invention employs tamper-resistant encoding techniques in a novel manner to substantially alter the data representations used to communicate information among software components, with corresponding changes to the code manipulating the data in these representations. As well, different instances of a protected system can be created such that representations differ among instances (i.e. if a malware writer studies one instance of the protected system, the resulting malware will then not work against another instance).

While the TRS encoding can be effected on certain communications to prevent particular types of attack, the invention can also defend software and systems from unknown, future malware. This is in direct contrast to existing techniques such as virus- and worm-detection systems which depend on historical information. It depends on an ability to invent unique dialects by which system components will communicate. No creator of malware can anticipate what dialects might be chosen for any given instance of a system protected by the invention.

The preferred embodiments described hereinafter provide many further advantages over the prior art.

In the preferred embodiment of the invention, some portion of communications among components are encoded at each component level, and the code dealing with the encoded communications is modified to operate on the information in its new form.

1.0 Implementing the Invention at the Instruction and Routine Levels

For instructions communicating via data in registers and variables, and routines communicating via data in parameters, return values, variables, and possibly registers, the preferred approach is to apply techniques described in the co-pending patent applications identified under items C and D above (data-flow encoding and mass data encoding respectively), although other forms of TRS encoding for data-flow or mass data (such as those techniques described in reference A above) could also be used. References C and D are concerned with protection against human attackers armed with sophisticated tools, rather than against automated, so in the preferred embodiment they are modified somewhat for the sake of performance. Such modifications are not essential, but may be helpful where the performance of a protected system is important.

1.1 Protecting Data-Flow

As noted above, data-flow refers to the 'ordinary computation' of a program: addition, subtraction, multiplication, division, Boolean computations, masking operations, and the like: the scalar data-flow of a program.

Figure 3:
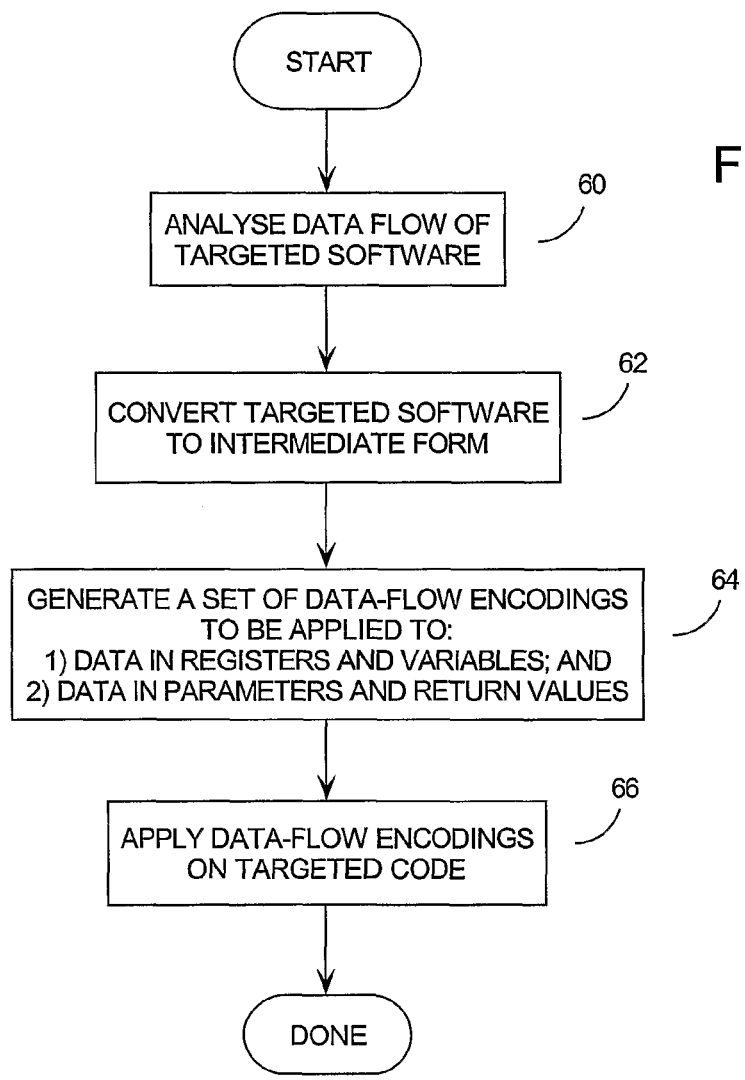
FIG. 3 presents a flow chart of a method for performing data-flow encoding in an embodiment of the invention.

To protect the data flow of a software program it is first preferable to analyze the data-flow aspects of the software to be protected, and convert them into an easily manipulated form in which data-flow is exposed (in the preferred embodiment the SSA form is used). These two steps are shown as successive steps 60 and 62 in FIG. 3, but they could be performed in the reverse order.

It is common to compile high level software into machine code in two stages, using front-end and back-end compiler components which communicate using a universal intermediate code format. This allows the compiler writer to develop a single back or front end for a particular application, and he can interchange these components to suit different applications. For example, if he writes front ends for C, C++, and Smalltalk, and back ends for 386, 486 and Pentium platforms, he could compile code for all nine combinations of these back and front ends. When the code is in an intermediate form, the interdependencies of the intermediate statements are clear and the bounds on what re-sorting could be performed may be easily determined. The understanding of these interdependencies is what allows multi-threading and optimisation techniques as known in the art. SSA (single-static assignment) is one such intermediate form, and is commonly used.

Next, at step 64, a coordinated systems of encodings to be applied to the data in registers and variables, and in parameters and return values of routines, is chosen.

In the malware protection context, it is preferable that the encodings be chosen to minimize overhead. For example, the residue and polynomial encodings of the co-pending patent application identified under item C above are usable for malware protection, but may be too costly for deployment in all cases. For general use, the linear encoding is low-overhead, but even for the linear encoding, it is preferable to limit it to, say, a simple additive constant, and to apply it only to selected registers and values rather than all registers and values. For example, one could replace each instance of the variable x in the targeted software program, with x', where:

$$x'=x+k$$

and k is a randomly generated constant which is different for each instance of the targeted software program. Compilation will reduce the equations in the targeted software program so in many cases the constant k will disappear altogether. In this way, it is very easy to obtain both communication protection and diversity.

As noted in reference C, dependent encodings in which one encoded variable is insufficient to determine the value of any original (pre-encoding) variable, are desirable. However, again, it is preferable to limit its use to low cost encodings, such as simple addition, for the most part. E.g., one could define:

$$x'=x+y$$

$$y'=x-y$$

where x' and y' are the new values used in the encoded program and x and y are the original, pre-encoding values. That is, at each point in the targeted program where the variable x appears, it is replaced with its encoding. When this is done for a large number, or all, of the variables in the targeted program, the resulting code will bear little resemblance to the original code.

Note that the usual procedure in preparing TRS, is to "throw away the key" after the encoding is performed. That is, to destroy the encoding information, intermediate values and variables, used to perform the TRS encoding, after it has been completed. Thus, not even the owner can reverse engineer the encoded software.

Other kinds of low-overhead encodings which can be applied include 1's complement encoding, in which each bit of a value is inverted, or exclusive-or-ing a value with a random constant mask, m, as in:

$$x^1 = x \oplus m$$

One can also create interdependencies with an encoding by using some other variable (whether pre-encoding or post-encoding) as the mask, as in:

$$x^1 = x \oplus y \text{ -or- } x^1 = x \oplus y^1$$

Data variables or values encoded in this way are extremely difficult to disassemble or disaggregate.

Many more low-overhead encodings will be clear to experienced compiler writers from the teachings herein. In the preferred embodiment, wherever minimal overhead is required, encodings which can be expressed in terms of one operation (as shown above) are chosen in preference to encodings requiring multiple operations, and computationally inexpensive encoding operations (e.g., addition, subtraction, or bitwise exclusive-or) are chosen in preference to more expensive ones (e.g., multiplication, division, remainder).

In general, for encoding of data-flow, it is preferable to use approaches identical to or similar to those in reference C, but in the malware protection context, to:

1. apply them to fewer variables, registers, parameters, and return values;
2. favour encodings with low overhead;
3. to apply such encodings where their added overhead has less effect (I.e., in parts of the code with low execution frequency); and
4. focus more encodings in parts of the system where commands are communicated from one component to another and less—or none—in other parts of the system (e.g., encoding parameters of command APIs is highly desirable, but encoding parameters of arithmetic routines such as sqrt or log is unnecessary).

As in reference C, however, it is preferable that the encoding be done first by developing a co-ordinated plan (systems of equations, and the like) at step 64 and then modifying the code at step 66. A co-ordinated and interdependent system of encodings will be far harder for malware to bypass by pattern matching than point-wise code changes.

What constitutes 'low overhead' depends on the context. In arithmetic computations, 'low overhead' means encodings which can be handled in a few machine cycles. In input/output (I/O) computations (i.e., in computations handling input data or output data) much more overhead can be tolerated since I/O is already slow relative to internal computations, and the added overhead is much less noticeable in this context. Computations on buffers containing strings to be interpreted as commands may tolerate even higher overheads without noticeable effect. Computations on strings in other contexts should tolerate higher overhead than simple arithmetic computations, but not as high as those permissible in the I/O or command buffer contexts.

As noted above, further information on data-flow encoding is available in the co-pending patent application titled: Tamper Resistant Software Encoding, filed under the Patent Co-operation Treaty on Jun. 8, 2000, under Ser. No. PCT/CA00/00678, by Stanley Chow, Harold Johnson, and Yuan Gu.

1.2 Protecting Mass Data

The term mass data refers to aggregate data structures of various kinds, such as arrays, character strings, records with named fields, discrete unions, records linked by pointers and residing in dynamic or 'heap' storage, I/O buffers, command buffers, and the like. Accordingly, mass-data encoding protects the contents of these data structures.

Mass data encoding generally relies on the random or pseudo-random dispersion of data being stored, throughout the available memory or an area of the available memory. This dispersion makes it very difficult for an attacker to locate certain pieces of data he is searching for, and also distributes the data values with respect to one another. Thus, data are not stored in areas of the memory one might expect them to be, and there are no clearly identifiable blocks or patterns of data in the memory.

Mass data encoding is relevant to the defence of the invention at all levels of a system to be protected. In general, at higher levels of a system, communications among components are almost universally in the form of mass data of some kind: I/O buffers, command buffers, command invocations, messages, and command scripts, are all embodied in forms of mass data. Even invocations via APIs often involve some form of mass data.

The computations dealing with these are more costly than simple computations. For example, string manipulation can involve substantial scanning and copying of aggregate values, and traversing pointer-linked data structures in dynamic storage involves indirection, which (due to caching effects) tends to be slower than access to local values. I/O and command buffer processing generally involve moving information and control from one level of the system to another, which incurs increased cache misses, may cause the memory mapping to change with impact on mapping caches and reading mapping data from main memory into the mapping unit, with resulting substantial execution costs.

Consequently, somewhat more complex encodings for mass data can be used, especially in the string-manipulation, I/O, and command buffer contexts.

However, it is preferable to avoid overheads as high as those described in reference D, except in cases where their impact on performance is amortized over an already substantial execution cost. Many such contexts exist in the malware protection context, but there are also contexts where higher performance is important.

In reference D, an elaborate encoding scheme for creating a TRS mass data encoding is described. Even allowing for the higher overheads already associated with the forms of mass data listed above, using this scheme without modification incurs significant overheads:

1. the mass data encoding in reference D can certainly be used in a malware defence, but it is too slow for use in performance-critical circumstances, where time overheads should be small enough that an ordinary user will not notice them; and
2. the methods in reference D also increase the storage space occupied by data so encoded, which is not always permissible in the malware defence context, since it could incur added main memory storage, disk storage, and so on. It would also increase the cache miss rate (caches have a fixed capacity), thereby further slowing execution, which again should be avoided if the context is performance-critical.

However, the general properties of the encoding in reference D remain desirable for malware defence:

1. data locations are scrambled, so the relative addresses of data entities relative to one another become non-obvious;
2. the contents of data locations are encoded in a location-dependent manner: no fixed decoding applies to the data locations so encoded; and
3. the encoding of pieces of data is implicit in the executable code accessing the data. As a result, the stored information is very hard to understand in isolation: one must understand the stored data, and the code which accesses it, as a unit.

A simple technique for performing mass data encoding is to respond to a request to store a data value at a virtual address, by mapping that virtual address onto a randomly selected actual address. This mapping may be done in a truly random manner, but will generally be done in a pseudo-random manner, because of the difficulties in generating truly random numbers in pure software. A desirable technique for generating pseudo-random address is by use of a hash function, which generates what appears to be a random number from a given input. In the formal sense, the definition of a hash function is somewhat more restrictive, but it is clear in this case that any function may be employed which maps a given input onto a random or pseudo-random output. Each time the encoded software routine is executed, it would access the stored data transparently because the pseudo-random mapping is built into the encoded program.

A number of lower-overhead forms of mass data encoding are now described which are thus part of the preferred embodiment wherever high performance is desirable.

For addressing, one could use a modest overhead encoding for an address a such as:

$$a' = a \oplus \left( \left[ \frac{a}{k} \right] \bmod m \right)$$

where k is the grain size (e.g. k=4 is suitable for k the typical grain size of a C-language int value on a byte-addressed machine), and m is the scrambling range. For efficiency, it is desirable for k and m to be powers of two, say, $k=2^K$ and $m=2^M$. Then x (the entity of which a is the address) can be replaced with a C-expression such as:

*(T*)((int)&x^(((int)&x>>K)&Z))

where $Z=2^M-1$ and T is the type of x. The prefix & and (int) operations have no inherent run-time cost, so the above expression has a three-operation overhead, where all of the operations are typically one-cycle on modern machines. Thus, this encoding is quite efficient.

To encode data in a code-location-dependent manner, one could use an encoding for a data-value v such as v+c where c is a code-location-dependent constant (clearly, if two code-locations could access the same location, they would have to use the same c constant, but code-locations known to access different locations could use distinct ones.) Encoding uses the formula v'=(v+c) mod W, where W is the natural modulus of the machine for values such as v. This is implemented in C by the expression "v+c" (or for decoding, "v−c"), which has a one operation, typically one-cycle overhead, and is quite hard for malware to penetrate, since it makes the representation of a value almost arbitrary. Encodings are code-location-dependent, and the meaning of the data is can only be discovered by considering code and data as a unit.

Figure 4:
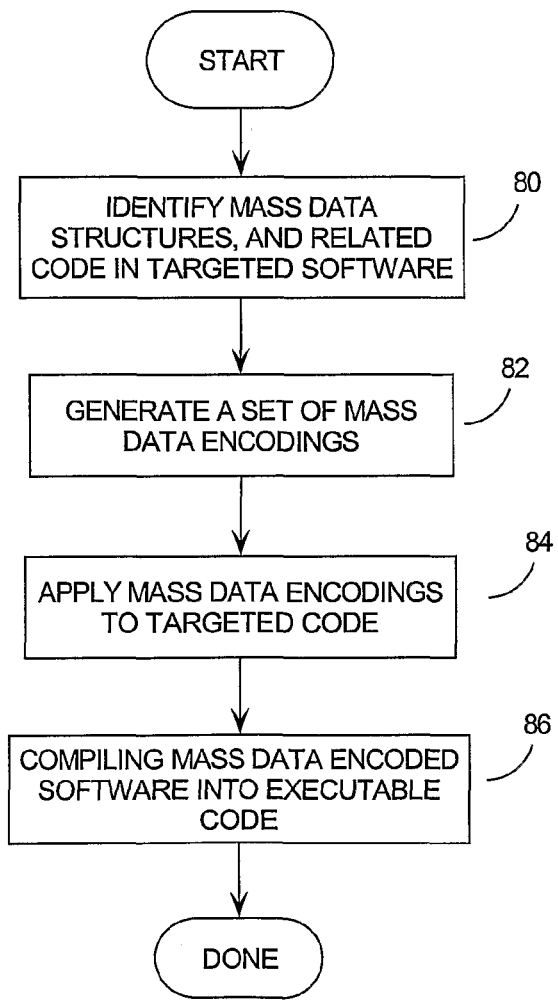
FIG. 4 presents a flow chart of a method for performing mass data encoding in an embodiment of the invention.

These encodings could be implemented simply as shown in the flow chart of FIG. 4. To begin with, the targeted software code is analysed at step 80, and suitable mass data structures are identified. A set of encodings are then generated at step 82, and applied to the targeted code at step 84. The mass data encoded software code can then be compiled for operation at step 86.

The steps of this process can easily be implemented in an automated manner. The lines of code of the targeted software can easily be parsed to identify particular data structures at step 80, and fixed encodings like those described above, can be used to generate new code particular to those data structures. That is, it is straightforward to identify two-dimensional arrays, for example, and execute an encoding routine suited for the encoding of two-dimensional arrays.

If random or pseudo-random constants are used to generate the new code at step 82, it is necessary for the encoding routine to remember those constants while the new code is being generated, but once it is complete, those data can be discarded. This type of processing would be well known to one skilled in the art of writing tamper-resistant encoding software.

Other low-overhead address encodings and processes for implementing such codings would be clear to an experienced compiler-writer from the teachings herein. Additional details on mass data encoding appear in: Tamper Resistant Software—Mass Data Encoding, filed under the Patent Co-operation Treaty on Apr. 12, 2001, under Ser. No. PCT/CA01/00493); inventors: Stanley Chow, Harold Johnson, and Yuan Gu.

2.0 Implementing the Invention at Higher Levels

Above the levels of communicating instructions and routines are components such as threads, processes, programs, and network nodes. All of these components communicate by passing data in some form, which is typically mass data (messages, command buffers, I/O, network traffic), but (infrequently) may be simpler data.

As such, all can be subjected to encoding according to either the simple data codings discussed in section 1.1 Protecting Data-Flow above, or to either the mass data coding described in reference D, where high overhead is acceptable, or a low-overhead mass data coding as described in 1.2 Protecting Mass Data above, which is the preferred embodiment in any high-performance malware protection context.

This applies to all forms of communication among such software components, because all such communication is ultimately in the form of strings of bits, and as such, can be subjected to such encoding.

3.0 The Defence of the Invention and Co-Operation

If the invention were applied blindly to all levels of a system, encoding every form of communication, the protected system, whether a single program, a collection of cooperating programs, the entire software of a computer, or the entire software of a network of computers, would only be able to communicate internally. Communication and cooperation with the outside world, whether external computer systems or users, would be impossible, and the system would become effectively useless.

In order to make the defence practical, the following approach is recommended:
1. leave unencoded any communication to or from a human user; and
2. wrap incoming invocations, commands, and data entities which stimulate the performance of actions, in software logic which determines whether the invocation, command, or data element is encoded or unencoded. Once this distinction has been made, the following can be applied:
   a. if it is encoded, executing the invoked entity, or performing the command, or carrying out any stimulated action, without any special restrictions, since the communication is trusted; and
   b. if it is unencoded, then the communication is not trusted: the invoked entity, or the command, or any stimulated action, should be refused if it is intrinsically hazardous under hostile control, or restricted to non-hazardous aspects of its execution.

4.0 Applying the Defence of the Invention Efficiently

If the defence of the invention was applied everywhere, even with the refinements for co-operation mentioned in section 3.0, the application would involve considerably more work than is really necessary.

Not every communication in a system can be subverted by fraudulent communication to hazardous effect. Universal coverage, modulo the refinements in section 3.0, is certainly permissible, however, one would generally limit coverage of the invention as follows:
1. fully encode any communications which are known to constitute points of vulnerability when the defence of the invention is not employed (with the encoded/unencoded splitting mentioned in section 3.0);
2. partially encode communications which, while not known to constitute vulnerabilities, may nevertheless provide avenues of attack. That is, the intensity and frequency of encodings for such communications can be reduced; and
3. do not encode communications whose subversion will have innocuous results.

If the impact on a system of fraud at a particular point is harmless, it can simply be ignored, and left in its original form.

In other words, one should first assess the vulnerability of the various code sites in the code of the software program or software system, and the nature of the attacks against them. The vulnerability and nature of the anticipated attacks may then be used to determine the intensity of the encoding to be applied, and hence, the effect of the encoding on execution speed of the software program or system at said code site.

5.0 Exemplary Implementation of the Invention

As an example of the working of the invention, consider a stack-smashing attack. Programs written in a programming language such as C or C++ are typically implemented such that the local data for each routine is provided on a stack.

5.1 Normal Operation

When a routine is called, its arguments are placed on the stack in addresses above (or in some implementations, below, depending upon whether the stack implementation uses an up-growing or down-growing stack) the addresses for the current stack frame. The frame usually contains two parts: a CONTROL area containing information used by the implementation to locate the caller's frame and the code location where execution should proceed on return from the call, and a DATA area where the arguments to the routine and the local data declared in the body of the routine are stored.

On entry to a routine, its DATA and CONTROL areas are allocated by modifying the TOP OF STACK register, the address of the previous frame and the routine return address are written into its CONTROL area, and the arguments are copied into the appropriate locations in its DATA area.

On return from a routine, its stack frame is deallocated by restoring the TOP OF STACK register from the value stored in its CONTROL area and branching to the return code address stored in its CONTROL area.

5.2 Stack-Smashing Attacks

Suppose there is a routine which reads input from a terminal or network link into a data-buffer stored in the routine's stack frame. The data-buffer would typically be an array of characters in the DATA area of the stack frame. If the implementation does not check for array-overflow (i.e., indexes beyond the bounds of the array), then the attacker can send a sufficiently-long message to overflow the data-buffer (the array), thereby causing some of the characters of the message to overwrite the CONTROL area of this routine (or the previous routine, depending on which end of the stack-frame the CONTROL area occupies and which way the stack grows).

Now suppose that the message is carefully chosen such that:
1. the spurious return address points into the memory overwritten by the message itself; and
2. the part of the message to which the return address now points contains executable instructions, which carry out some illicit action on behalf of the attacker.

If the attack is carried out against a program which typically executes with extra privileges (such as the SENDMAIL program), this illicit action can result in the attacker or the attacker's code taking over the attacked computer with full system privileges, at which point the attacker can do whatever she/he wants with the attacked computer.

5.3 How the Instant Invention Foils the Attack

According to the instant invention, various data components have differing data encodings. For example, the array which acts as the data-buffer into which the message is stored has one encoding, and the CONTROL area uses a different data encoding. As a result, the attacker's intended effect of setting the return address to a desired location containing desired instructions fails: the return address is not stored as-is, but is stored according to the data encoding of the array. Thus, the return address is subsequently read according to the distinct, and hence incompatible, encoding of the CONTROL area. As a result, the return address is simply some nonsense value. The attempt to use the return address therefore crashes the program, which is relatively harmless, as opposed to allowing the attacker to take over the user's computer, which is far from harmless.

Note that, even if the attacker has access to a particular instance of a program thus protected, since different instances of the program will use different encodings, privileged access to any given instance only provides the ability to attack that instance and no others. That is, this defence is effective even against insider attacks, so long as an organization varies the instances it uses of the programs to be protected.

6.0 Are Software Obfuscation Techniques an Effective Defence Against Malware?

One way to obtain the diversity would be to apply software obfuscation techniques such as those described in the following:

1. Christian Sven Collberg, Clark David Thomborson, and Wai Kok Low. Obfuscating techniques for enhancing software security. Filed under the Patent Cooperation Treaty in 1998 under Ser. No. PCT/US98/12017; International Publication Number WO 99/01815, 1997;
2. Christian Sven Collberg, Clark David Thomborson, and Wai Kok Low. A taxonomy of obfuscating transformations. Technical Report 148, Department of Computer Science, University of Auckland, 1997;
3. Christian Sven Collberg, Clark David Thomborson, and Wai Kok Low. Breaking abstraction and unstructuring data structures. In IEEE International Conference on Computer Languages, pages 28-38, 1998;
4. Christian Sven Collberg, Clark David Thomborson, and Wai Kok Low. Manufacturing cheap, resilient and stealthy opaque constructs. In Symposium on Principles of Programming Languages, pages 184-196, 1998; and
5. SourceGuard™ SourceGuard is a commercial version of HashJava.

Such methods normally inject some degree of randomness into implementations, so one might expect them to provide some degree of protection against malware.

The problem is that software obfuscation is directed to a quite different problem: the problem of making software difficult for a human attacker to understand. In particular:

1. obfuscated software deals with hiding information and algorithms in software which must operate on potentially hostile host systems with potentially hostile owners, where as malware defences are concerned with protecting host systems against intentionally hostile software entities intended to penetrate them. Protecting a piece of software against a hostile environment is quite different from protecting an environment against hostile pieces of software, so what is appropriate for the former is quite different from what is appropriate for the latter;
2. existing approaches to software obfuscation will probably have little effect on many popular malware threats. For example, one of the most widely used malware techniques is to force a buffer overflow. Typical obfuscation techniques would be ineffective against such an attack because changing the names of variables, removing debug information, introducing irreducible flow graphs, and the like, do not affect buffer sizes;
3. overheads associated with certain techniques of obfuscation (e.g., those described in "Breaking abstraction and unstructuring data structures", and "Manufacturing cheap, resilient and stealthy opaque constructs") may be inappropriately high for the malware protection context, which requires broad deployment for many kinds of applications, including those for which a significant degradation in performance is unacceptable; and
4. the testing needed to validate software entities treated using such sophisticated software obfuscation methods would be prohibitively expensive in the malware-protection context, where wide deployment at low cost is highly desirable.

Thus, such obfuscation techniques are ineffective against comprehensive attacks.

Other Options and Applications

The invention can be applied with many other options and in many other applications, including the following:

Protection of the targeted software could also be complemented by applying other tamper-resistant encoding techniques such as control-flow encoding and white-box cryptography. Consideration should be given, however, for the added overhead.

Control flow encoding is used to encode and protect the control logic, branch, and subroutine structure of the program by altering these structures and the decision branches that access them. Various control flow encoding techniques are described in the co-pending patent application filed under the Patent Cooperation Treaty application no. PCT/CA00/00943, titled: Tamper Resistant Software-Control Flow Encoding.

White-box cryptography protects cryptographic computations so that they can be performed without revealing internal data such as encoding constant or secret keys. White-box cryptography is described in the co-pending patent application filed under the Patent Cooperation Treaty application no. PCT/CA01/00493, titled: Tamper Resistant Software-Mass Data Encoding.

It is also worthwhile to note that TRS is very different from encrypted software. Software that has been encrypted can only be used by decrypting it. TRS, on the other hand, can be executed in its protected form; TRS is executable, just as normal software is.

The protection provided by TRS is relative, rather than absolute. The level of protection provided, varies with the degree and variety of software encoding used in converting the software to be protected into TRS form. When an appropriately strong level of TRS protection is used, TRS is highly effective in protecting software from automated attack.

While particular embodiments of the present invention have been shown and described, it is clear that changes and modifications may be made to such embodiments without departing from the true scope and spirit of the invention.

It is understood that as de-compiling and debugging tools become more and more powerful, the degree to which the techniques of the invention must be applied to ensure effective tamper protection, will also rise. As well, the concern for system resources may also be reduced over time as the cost and speed of computer execution and memory storage capacity continue to improve.

These improvements in system resources will also increase the attacker's ability to overcome the simpler tamper-resistance techniques included in the scope of the claims. It is understood, therefore, that the utility of some of the simpler encoding techniques that fall within the scope of the claims, may correspondingly decrease over time. That is, just as in the world of cryptography, increasing key-lengths become necessary over time in order to provide a given level of protection, so in the world of the instant invention, increasing complexity of encoding will become necessary to achieve a given level of protection.

The method steps of the invention may be embodiment in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps.

Similarly, an electronic memory means such computer diskettes, CD-Roms, Random Access Memory (RAM), Read Only Memory (ROM) or similar computer software storage media known in the art, may store code to execute such method steps. As well, electronic signals representing these method steps may also be transmitted via a communication network.

While exemplary embodiments described herein focus on particular software applications and their vulnerabilities, it would be clear to one skilled in the art that the invention may be applied to other computer or control systems. The protected software of the invention can be stored on any suitable storage device and executed on any manner of computing device. It is just as mobile as any other software application, and can be downloaded to users over the Internet or via email, transferred from a personal computer (PC) to a laptop, or stored on a CD ROM or hard disk drive. Accordingly, the invention could be applied to:

1. computers such as personal computers, personal digital assistants, laptop computers and other similar devices;
2. network and system components such as servers, routers, gateways and other similar devices; and
3. all manner of appliances having computer or processor control including telephones, cellular telephones, televisions, television set top units, point of sale computers, automatic banking machines and automobiles.

A person understanding this invention may now conceive of alternative structures and embodiments or variations of the above all of which are intended to fall within the scope of the invention as defined in the claims that follow.

What is claimed is:

1. A method of protecting a software application against malicious attack, the method comprising:
    identifying portions of the software application that effect first and second communications between components of the software application, the first and second communications being vulnerable to malicious attack;
    determining that at least one of the first or second communication one of has limited vulnerability to attack and is vulnerable only to attacks of limited security concern;
    selecting a light-weight, low-overhead TRS encoding as the corresponding first or second TRS encoding and is vulnerable only to attacks of limited security concern;
    selecting a first tamper-resistant software (TRS) encoding to render the first communication resistant to malicious attack;
    selecting a second TRS encoding to render the second communication resistant to malicious attack, the second TRS encoding differing from the first TRS encoding; and
    generating an instance of the software application by applying the first TRS encoding to the portion of the software application that effects the first communication and applying the second TRS encoding to the portion of the software application that effects the second communication, such that data representations used in the first and second communications are mutually incomprehensible.

2. A method of protecting a software application against malicious attack, the method comprising:
    identifying portions of the software application that effect first and second communications between components of the software application, the first and second communications being vulnerable to malicious attack;
    determining that at least one of the first or second communication, one of, has a high degree of vulnerability to attack and is vulnerable to attacks of serious security concern; and
    selecting a heavy-weight, higher-overhead TRS encoding as the corresponding first or second TRS encoding
    selecting a first tamper-resistant software (TRS) encoding to render the first communication resistant to malicious attack;
    selecting a second TRS encoding to render the second communication resistant to malicious attack, the second TRS encoding differing from the first TRS encoding; and
    generating an instance of the software application by applying the first TRS encoding to the portion of the software application that effects the first communication and applying the second TRS encoding to the portion of the software application that effects the second communication, such that data representations used in the first and second communications are mutually incomprehensible.

3. A method of providing diverse instances of a software application resistant to malicious attack, the method comprising:
    identifying portions of the software application that effect first and second communications between components of the software application, the first and second communications being vulnerable to malicious attack;
    determining that at least one of the first or second communication, one of, has limited vulnerability to attack and is vulnerable to attacks of limited security concern;
    selecting a light-weight, higher-overhead TRS encoding as the corresponding first or second TRS encoding.
    selecting a first tamper-resistant software (TRS) encoding to render the first communication resistant to malicious attack;
    selecting a second TRS encoding to render the second communication resistant to malicious attack, the second TRS encoding differing from the first TRS encoding; and
    generating diverse instances of the software application by applying different instances of the first TRS encoding and different instances of the second TRS encoding to the portions of the software application that respectively effect the first and second communications, such that, for a given instance of the software application, data representations used in the first and second communications differ, and the data representations differ among instances.

4. A method of providing diverse instances of a software application resistant to malicious attack, the method comprising:
    identifying portions of the software application that effect first and second communications between components of the software application, the first and second communications being vulnerable to malicious attack;
    determining that at least one of the first or second communication, one of, has a high degree of vulnerability to attack and is vulnerable to attacks of serious security concern;
    selecting a heavy-weight, higher-overhead TRS encoding as the corresponding first or second TRS encoding;
    selecting a first tamper-resistant software (TRS) encoding to render the first communication resistant to malicious attack;

selecting a second TRS encoding to render the second communication resistant to malicious attack, the second TRS encoding differing from the first TRS encoding; and generating diverse instances of the software application by applying different instances of the first TRS encoding and different instances of the second TRS encoding to the portions of the software application that respectively effect the first and second communications, such that, for a given instance of the software application, data representations used in the first and second communications differ, and the data representations differ among instances.

\* \* \* \* \*